Dec. 7, 1937. G. H. BUSHWAY Re. 20,570
COOKING MACHINE
Original Filed July 8, 1936 3 Sheets-Sheet 1
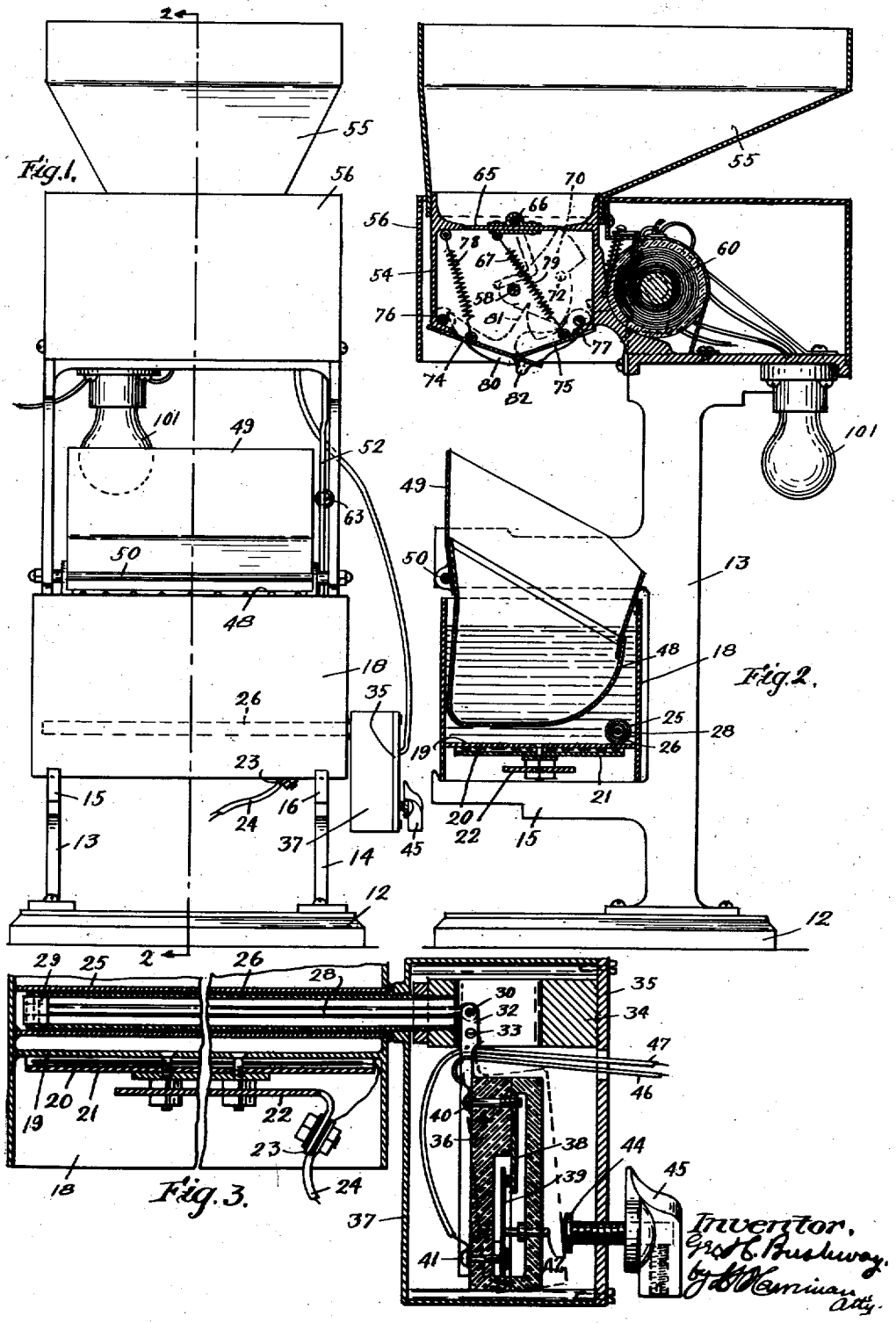

Dec. 7, 1937. G. H. BUSHWAY Re. 20,570
COOKING MACHINE
Original Filed July 8, 1936 3 Sheets-Sheet 2
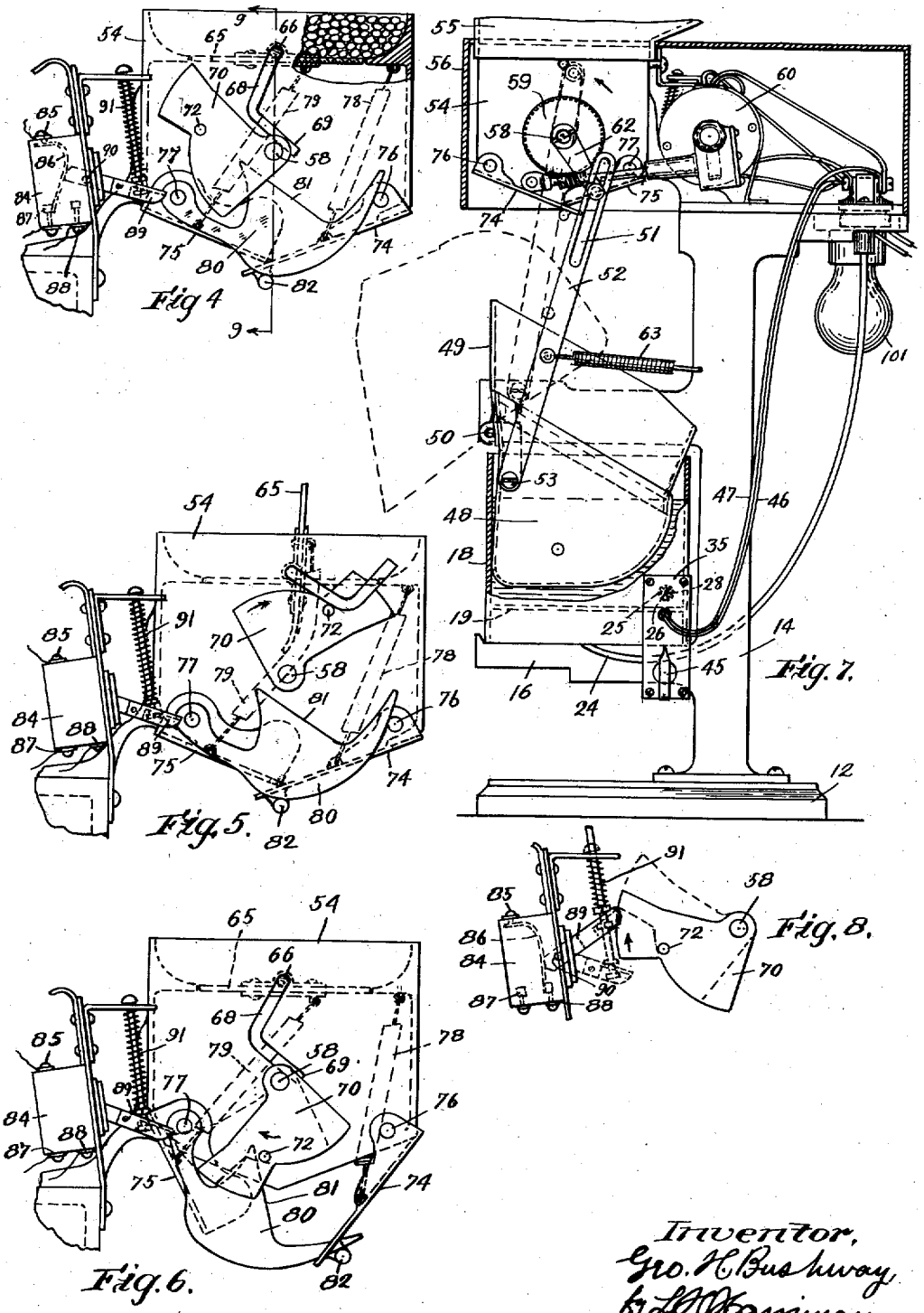
Inventor,
Geo. H. Bushway,
by L. D. Harriman
Atty.

Dec. 7, 1937. G. H. BUSHWAY Re. 20,570

COOKING MACHINE

Original Filed July 8, 1936 3 Sheets-Sheet 3

Inventor.
Geo. H. Bushway
by J. B. Hamman
Atty.

Reissued Dec. 7, 1937

Re. 20,570

UNITED STATES PATENT OFFICE 20,570

COOKING MACHINE

George H. Bushway, Hampton, N. H., assignor to Electricooker, Inc., Newburyport, Mass., a corporation of Massachusetts Original No. 2,074,044, dated March 16, 1937, Serial No. 89,517, July 8, 1936. Application for reissue September 17, 1937, Serial No. 165,063

23 Claims. (Cl. 53—7)

This invention primarily relates to machines for cooking or frying various materials, usually in granular form, such as nut meats, potato chips, etc., in oil, or similar cooking liquid, and which are adapted to perform the cooking operation automatically and continuously on material supplied thereto from a hopper, or the like.

Prior to my invention various machines of this type have been produced which are to an extent automatic, in that they discharge the cooked material either at regular intervals or continuously.

While the cooking operation may be successfully timed in many instances, difficulty is frequently encountered in securing uniform results under all conditions and particularly in performing the cooking operation automatically on material such as nut meats, which may be supplied from a hopper, without the necessity of having a person more or less constantly in attendance.

The primary object of my invention is to provide an automatically operating cooking machine of the type above referred to, in which the operation will be entirely automatic, and the results secured will be uniform, so that a hopper may be filled with material to be cooked and the machine set in operation and will continue to operate for an indefinite period without further attention, and will automatically discharge material which has been uniformly cooked, regardless of whether the quantity supplied to the machine at each cycle of operation is equal to the full capacity of the machine, or only partly so.

Another object of my invention is to simplify the construction of machines of this type, so that various mechanical difficulties, to which prior machines have been subject, will be eliminated, and the machines may be constructed at a reduced cost.

In operating machines of this type, I have discovered that if the material to be cooked, such as nut meats, is dumped into cooking oil which has been heated to a certain temperature, which temperature will then be necessarily lowered by heat exchange between the material and oil, that, when the temperature of the oil has been raised again to the maximum point, the cooking operation will be finished.

In accomplishing the primary object of my invention, I provide automatic means for supplying material to be cooked and for discharging the same when cooked, which is automatically controlled by a thermostat arranged in position to be influenced by the heat from the oil, to which heat is more or less constantly supplied, so that when the temperature of the oil is raised to a predetermined point, a suitable quantity of the material to be cooked will be discharged into the oil, with the result that the temperature of the oil will be lowered, then, as the heating of the oil will be continued, the temperature of the oil will be gradually raised to the predetermined point again, and then, as the cooking operation will be finished, the cooked material will be automatically removed from the oil and a fresh charge of the material will be delivered to the oil, the above described cycle of operations being repeated indefinitely, or so long as the hopper, from which the material is deliverd, is supplied therewith.

In carrying out the above described operations, I provide electrical means for both heating the oil and for operating the material supplying and dumping means, so that the machine may be successfully operated by merely making a connection with an electrical source.

For a more complete disclosure of the means which I preferably employ in accomplishing the objects of my invention above referred to, reference is now made to the following specification, in connection with the accompanying drawings, in which:

Fig. 1 is a front elevation of a machine containing a preferred embodiment of my invention.

Fig. 2 is a sectional view thereof at line 2—2 of Fig. 1.

Fig. 3 is a detail sectional view of the thermostatic means which is employed.

Figs. 4, 5, 6 and 8 are views in side elevation of a portion of the operating mechanism at one side of the machine and showing the parts in different positions.

Fig. 7 is a view in side elevation of the opposite side of the machine.

Figure 9:
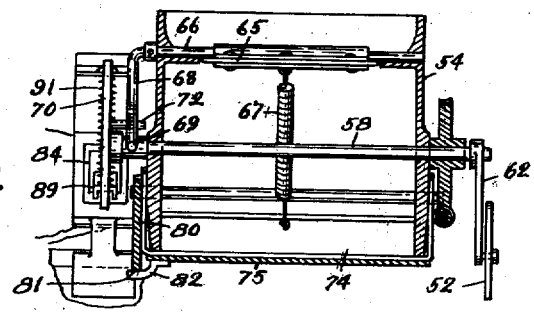
Fig. 9 is a sectional view at line 9—9 of Fig. 4.

As shown in the drawings, the base 12 has two uprights 13, 14 thereon, each upright having a bracket arm 15, 16 extending horizontally from the front edge thereof to provide a support for a container 18 having vertical sides which rest directly on the bracket arms and a raised bottom 19, against the under side of which an electrical heating element 20 is clamped by a plate 21, which is held in position by means of screws and nuts. A bracket 22 is also similarly secured by the same nuts on said screws and carries the terminals 23—23' of the element 20, to which the wires of a cord 24 are connected. A tube 25 extends horizontally through one side of the container close to, and above its bottom, and terminates against its opposite side, and a liquid tight connection, as by means of solder, is provided between each end of the tube and the adjacent walls, as shown in Fig. 3. A thermostat is inserted through the open outer end of tube 25, which consists of an expansion tube 26, which is closely fitted to tube 25, and a rod 28 which is disposed therein, the inner end of rod 28 being connected by a pivot 29 to the inner end of tube 26, and the outer end of said rod being connected by a pivot 30 to one arm of a lever 32, which is mounted on a pivot 33, fixed in a support 34 attached to the outer end of tube 25. A switch mechanism is enclosed in a casing 37, which is fixed on the outer end of tube 26, said mechanism comprising an insulating base member 36, which is attached to lever 32 and an insulating cover member which is connected to said base member. The base member has a fixed contact member 38 and a spring contact member 39, to which terminals 40, 41 are respectively connected, and a pin 42 is reciprocally mounted in cover member 37, the outer end of which protrudes therethru, and the inner end of which is arranged in engagement with member 39. An adjustable abutment 44, having a handle 45 on its outer end, is extended through and threaded in casing 35, the inner end of said abutment being arranged to be engaged by pin 42, so that when the tube 26 expands it will cause the rod 28 to be pulled to the left in Fig. 3, causing lever 32 to swing on its pivot to the dotted line position of Fig. 3, thereby forcing pin 42 against abutment 44, so that said pin acts to force contact member 39 out of contact with member 38, thereby breaking the circuit between terminals 40, 41, to which wires 46, 47 are respectively connected.

The container 18 is open at its top and a reticulated basket 48, having an imperforate rim piece 49 on its top, is mounted on a pivot 50, the arrangement being such that said basket may swing on its pivot from the normal or cooking position of Figs. 2 and 7 to a dumping position indicated by the dotted line position of Fig. 7. The means for moving the basket between these positions comprise a link 52, which is connected at one end to one side of the basket by a pivot 53 located beneath and at one side of pivot 50, so that when the link is drawn upward the basket will be swung to its dumping position.

A vertically disposed conduit 54, to the upper end of which a magazine or hopper 55 opens, is mounted in a casing 56 on the upper ends of the standards 13, 14, and a shaft 58 is journaled at each end in the sides of said conduit and has a worm gear 59 secured on one end thereof, said gear being driven by a shaft, which is in turn driven through another worm gear from the shaft of an electric motor 60. An arm 62 is secured on shaft 58 and the end thereof is pivotally engaged with the link 52 in an elongated slot 51 therein, the arrangement being such that, when the motor is driven, arm 62 will be swung upward, causing the pivot in the end thereof to engage the link at the upper end of its slot, thereby lifting the basket until it swings to the dumping position shown in broken lines in Fig. 7. It will be noted that, in the uppermost position of the arm and link, the pivot 53 is still at one side of the pivot 50 of the basket, so that the link is free to move downward, as the arm 62 swings downward. As a loose connection is necessary between arm 62 and link 52, a spring 63 is attached to the link and to a standard 14, which is placed under tension by the lifting movement, so that the spring acts to tilt back the basket until its center of gravity passes over its pivot 50, and it is free to swing back to its initial position by its gravity.

The conduit 54 is provided with an entrance valve 65, which is mounted at its middle on a shaft 66, so that when the latter is oscillated through 90° the valve will be moved from its horizontal to its vertical position, permitting a supply of material in the hopper to pass into the conduit. A spring 67 is attached to valve 65 at one side of its shaft and acts to return the valve to its closed position. A right angularly shaped arm 68 extends from the end of shaft 66, and a cam arm 70, having a projecting pin 72 therein, is mounted on the opposite end of shaft 58 from arm 62, and is so arranged that, when the shaft 58 is driven to lift the basket, pin 72 will engage the radially extending portion of arm 68 and swing the same to the position of Fig. 5, in which position the valve 65 will be fully open, then, on further movement of shaft 58, pin 72 will become disengaged from arm 68, permitting spring 67 to return the valve to its closed position of Figs. 4 and 6, in which position the right angularly extending portion 69 of arm 68 engages a boss in the side of the conduit in which the shaft 58 is journaled, and acts as a stop to prevent movement of the valve beyond its closed position.

The lower end of the conduit is closed by a pair of flap valves 74, 75 which are respectively mounted on pivot shafts 76, 77 at opposite sides of the conduit, said valves being normally held in closed position by springs 78, 79 respectively, in which position both valves are held in a downwardly inclined position, with the end portion of valve 74 overlapping the end of valve 75 at the middle of the conduit. The pivot shaft 77 has a cam arm 80 secured thereto, and the shaft 76 has a cam arm 82 which is arranged to extend beneath the arm 80. As thus arranged, after the pin 72 becomes disengaged from arm 68, so that valve 65 becomes closed, the pin then engages the straight edge portion 81 of arm 80 and causes the arm to swing downward and open valve 75 and at the same time arm 80, on being swung downward, engages arm 82, causing the valve 74 to be opened also. This movement does not occur until the basket has been returned or nearly returned to normal position, so that, by the opening of the valve 65, the conduit becomes filled with a measured quantity of material from the hopper, which is subsequently delivered to the basket. Continued movement of the shaft 58 carries the pin 72 out of contact with the arm portion 81, so that the springs 78, 79 then close the valves 74, 75.

A two way switch 84 is employed in the motor circuit, a form which may be employed being shown in Fig. 4. As shown, said switch has a terminal 85 to which a spring contact arm 86 is connected and is arranged for engagement with either a terminal 87 or a terminal 88. An operating lever 89 is pivoted at 90 and is normally pressed downward by a compression spring 91, in which position lever 89 holds arm 86 in contact with terminal 87, and, when lever 89 is swung upward to the full line position of Fig. 8, arm 86 will swing into contact with terminal 88. The arrangement is such that when pin 72 becomes disengaged from arm 80, the end portion of arm 70 engages the end of lever 89, and moves it to the full line position of Fig. 8.

Figure 10:
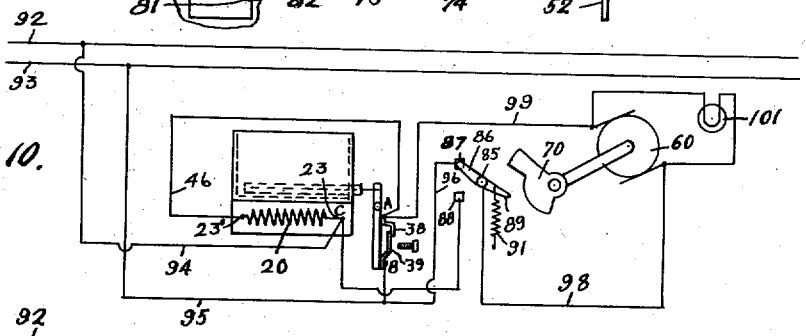
Figs. 10, 11, 12 and 13 are diagrams of the electrical connections.

The arrangement of the circuits may be best understood on reference to the diagrams of Figs. 10 to 13, of which Fig. 10 indicates the normal condition in which the heater is operating to heat the cooking liquid with which the container 18 will be supplied.

As indicated, the main line wire 92 is connected by a wire 94 to one of the heater terminals 23, and the other main line wire 93 is connected by wire 95 to the spring contact member 39, and the member 38 is connected by wire 46 to the other heater terminal 23', completing the circuit through the heater.

The motor 60 is operated by two different circuits at different times during the cycle in which the cooked material is discharged, when the temperature of the cooking liquid is raised to a predetermined point, and a fresh supply of the material to be cooked is delivered to the basket 48, and the parts are restored to the initial or starting position.

Figure 11:
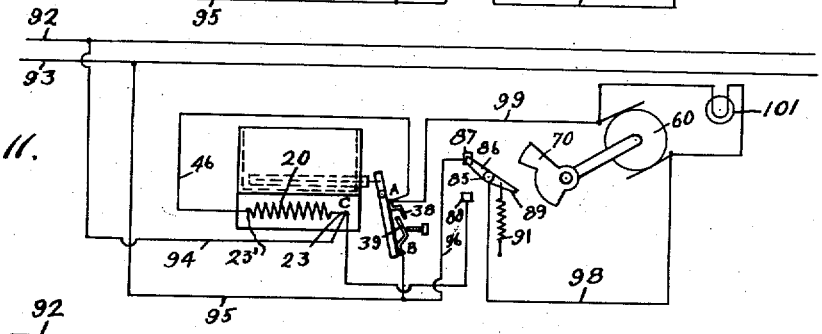
Figure 12:
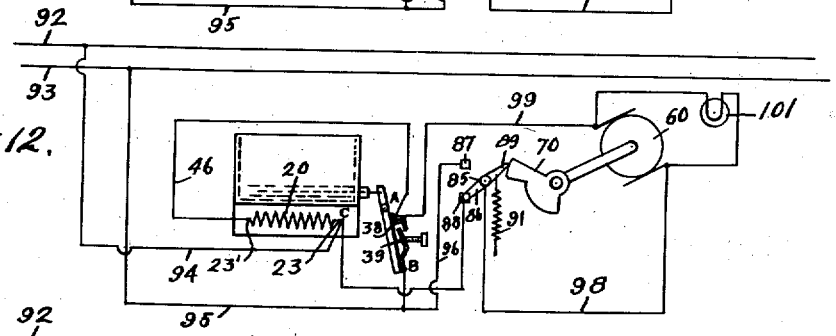

The terminals of the first motor circuit are indicated at A and B, terminal A being located at the thermostat at switch terminal 38 and terminal B at the switch terminal 39. A wire 96 leads from the terminal B to the two way switch terminal 87 and a wire 98 leads from the switch arm 86 to one of the motor terminals, and a wire 99 leads from the terminal A to the other motor terminal. As thus arranged, when the thermostat switch is closed, and terminals 38 and 39 are therefore in contact, the heater will be operated and the motor circuit A, B will be short-circuited by the thermostat switch, so that no current will pass thru the motor. When the temperature of the cooking liquid is raised to the predetermined point, for example, 350° F., the thermostat opens its switch, so that the motor circuit A, B, is placed in series with the heater circuit, as shown in Fig. 11, and the motor will be operated. The operation of dumping the cooked material from the basket and the delivery of a fresh supply thereto will then be performed, the parts reaching the position of Fig. 6. The arm 70 then engages the switch arm 89, and moves it from the dotted line to the full line position of Fig. 8, causing the switch member 86 to move into contact with the switch terminal 88, so that the parts are in the position of Fig. 12, in which position both the motor circuit A, B, and the heater circuit will be broken, so that the entire apparatus becomes inactive.

Figure 13:
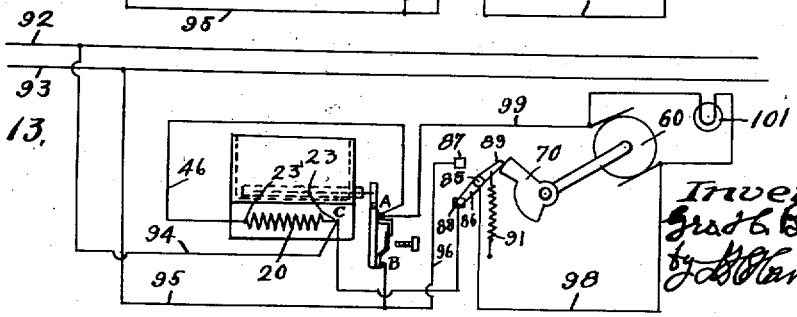

As a fresh supply of material has been discharged into the cooking liquid, and as the heater is shut off, the liquid will be cooled by heat exchange, causing the thermostat to contract until its switch is again closed and its members 38, 39 are moved into contact, so that the parts will then be in the position of Fig. 13, in which position the motor circuit A, C, and the heater circuit will be in parallel and both will be operated. The motor then starts moving the arm 70 out of contact with the switch arm 89, so that the spring 91 will be free to restore the arm 89 to the initial position of Fig. 10, thus breaking the motor circuit A, C, so that the motor comes to rest. All parts are thus restored to the initial position, so that the liquid will again be raised to the maximum temperature, and the operation above described will be repeated.

As indicated in the diagrams, an electric lamp 10, is arranged in parallel with the motor circuit, so that when the motor operates the lamp will be lighted. This arrangement is merely preferable, and in no way essential to my invention.

The provision of the two-way switch is necessary to prevent movement of the parts beyond the predetermined cycle and to permit restoration of all parts to the initial position indicated in Fig. 10, at the beginning of each cooking operation. It will be apparent that when the fresh supply of material is discharged into the liquid, the temperature of the liquid will be reduced, but a period of time is necessary to permit the cooling action to be transmitted to the thermostat and for the tube 26 to contract sufficiently to swing lever 32 back to an extent which will permit the switch members 38, 39 to come into contact again and thus restore the current through the heater, so that heating will be resumed. The length of this period varies under different conditions from approximately 20 seconds to two or more minutes, and, during this cooling period, the parts will remain in the position of Fig. 12, and the full line position of Fig. 8, in which position both the heater and motor are inactive. Consequently, even if the quantity of material supplied is very small, so that atmospheric temperature is principally effective in cooling the liquid, the material will not be likely to be overcooked, as the heater will be inactive until the heater circuit is restored, and, while the length of the cooking period after the heater circuit has been restored, will be less with a small quantity than with the full quantity, the results will be the same, so that under all conditions the material will be cooked uniformly.

It will be apparent that for different materials a different maximum temperature of the liquid may be necessary, and this may be varied by merely adjusting the position of the abutment 44. For cooking peanuts, or other nut meats, the maximum temperature which is most desirable has been found to be approximately 350° F.

If the supply in the hopper becomes exhausted and the current is not shut off, the machine will continue to operate at intervals as above described, the length of time in which all parts will be inactive while the liquid is cooling by the surrounding air being merely increased.

It will be apparent that the operation is entirely automatic and that no attention is required by an operator beyond the necessity of supplying material to the hopper and removing it after it has been discharged. While I have herein specifically described and illustrated my invention as adapted to the cooking of nut meats and the like, it will be understood that such showing is made by way of example only and not for purposes of limiting the invention, the scope of the invention being determined by the claims appended hereto.

I claim:

1. In a cooking machine, a container for cooking liquid, heating means therefor, a normally stationary electric motor, means arranged to be actuated by said motor to remove cooked material from the liquid, and a thermostat arranged to be influenced by the temperature of the liquid in the container and to set said motor in operation to remove the material when the temperature of the liquid is raised to a predetermined point.

2. In a cooking machine, a container for cooking liquid, heating means therefor, a normally stationary electric motor, means arranged to be actuated by said motor to remove cooked material from the liquid, and to deliver a fresh supply of material thereto, a thermostat arranged to be influenced by the temperature of the liquid in the container and to set said motor in operation when the temperature of the liquid is raised to a predetermined point, and means to discontinue the operation of the motor when the delivery operation has been finished.

3. In a cooking machine, a container for cooking liquid, heating means therefor, an electric motor, operating means arranged to be actuated thereby to remove cooked material from the container and deliver a fresh supply thereto, a thermostat arranged to be influenced by the temperature of the liquid in said container, and means operated thereby to set said motor in operation when the temperature of the liquid has been raised to a predetermined point, and means to discontinue the operation of said motor when its delivering operation has been finished and to return said operating means to its initial position when the temperature of the liquid has been lowered below said point.

4. In a cooking machine, a container for cooking liquid, an electric heater for said container and an electric motor, operating means arranged to be actuated by said motor to remove cooked material from said container and deliver a fresh supply thereto, a thermostat arranged to be influenced by the temperature of the liquid in the container and means operated thereby to set said motor in operation when the temperature of the liquid has been raised to a predetermined point, and means to break the motor and heater circuits when the delivering operation has been finished, and to return said operating means to its initial position and restore the heater circuit when the temperature of the liquid has been lowered.

5. In a cooking machine, a container for cooking liquid, heating means therefor, a reticulated basket for containing the material to be cooked and normally disposed within said container, an electrical motor, means operated by said motor for moving said basket from the container to dump the contents thereof and for returning it to the container and for delivering a fresh supply of material to be cooked to said basket, and thermostatic means arranged to be influenced by the temperature of the liquid in the container to control the electrical supply to said motor and to cause operation thereof when the temperature of the liquid is raised to a predetermined point.

6. In a cooking machine, a container for cooking liquid, heating means therefor, a reticulated basket normally disposed within the container, a normally inactive electric motor, means arranged to be actuated by said motor according to a predetermined cycle to lift the basket from the container and discharge its contents therefrom and then to return the basket to the container and discharge a quantity of material to be cooked to the basket, a thermostat arranged to be influenced by the temperature of the liquid in the container, an electric circuit leading to said motor, and controlling means for said circuit, arranged to be operated by said thermostat to actuate said motor to perform said cycle, when the temperature of the liquid is raised to a predetermined point and to discontinue actuation thereof after a fresh supply of material has been delivered to the basket.

7. In a cooking machine, a container for cooking liquid, heating means therefor, a reticulated basket normally disposed within said container, a magazine for the material to be cooked having a discharge conduit arranged to deliver the material from the magazine to the basket when in position in the container, valvular devices in said conduit arranged to be alternately operated to deliver a measured quantity of the material to said basket, an electric motor, means arranged to be actuated by said motor according to a predetermined cycle when set in operation, successively to lift the basket from the container and discharge its contents at one side thereof, return the basket to the container and operate said valvular devices to deliver a fresh supply of material to the basket, a thermostat arranged to be influenced by the temperature of the liquid in the container to control the electrical supply to said motor and set the same in operation to perform said cycle when the temperature of the liquid has been raised to a predetermined point and to discontinue said operation when said cycle has been completed.

8. In a cooking machine, a container for cooking liquid, heating means therefor, an electric motor having two electrical circuits connected thereto, operating means arranged to be actuated by said motor to discharge cooked material from the container and deliver a fresh supply of material to be cooked thereto, and to return the same to an initial position, a thermostat, electrical controlling means arranged to be operated by said thermostat when the temperature of the liquid has been raised to a predetermined point, to set said motor in operation by current supplied to one of said circuits, to perform said discharging and supplying operations, means, arranged to be operated by said motor when it has performed said operations, to break said motor circuit before said operating means has been returned to initial position, means arranged to actuate said motor by current supplied to the other of said circuits when the temperature of the liquid has been lowered to a predetermined degree, to restore said operating means to initial position, and means to break said last named circuit when said operating means has been restored to initial position.

9. In a cooking machine, a container for cooking liquid, an electrical heater for said container, a thermostat arranged to break the heater circuit when the temperature of the liquid in the container is raised to a predetermined point, an electric motor having two electrical circuits connected thereto, operating means arranged to be actuated by said motor to discharge cooked material from said container and to deliver a fresh supply thereto and then to be returned to an initial position, controlling means for said motor circuits arranged to set said motor in operation by current supplied to one of said circuits when said heater circuit is broken to actuate said operating means to discharge the material from the container and deliver a fresh supply thereto, means to break the circuit before said operating means have been returned to initial position, means to close the other motor circuit when the heater circuit has been restored by the lowering of the temperature of the liquid and thereby return said operating means to intial position, and means to break the last named circuit when said operating means has been returned to said position.

10. In a cooking machine, a container for cooking liquid, an electric heater for heating liquid therein, a thermostat arranged to break the heater circuit when the temperature of the liquid has been raised to a predetermined point, an electric motor having a shunt connection with said heater circuit, so arranged that when the heater circuit is closed the motor will be inactive and will be set in operation when said heater circuit is broken by the thermostat, operating means arranged to be actuated by the motor when set in operation to remove cooked material from the liquid and to deliver a fresh supply of material thereto according to a predetermined cycle, and means to discontinue the operation of said motor when said cycle has been completed.

11. In a cooking machine, a container for cooking liquid, an electric heater for heating the liquid therein, a thermostat arranged to break the heater circuit when the temperature of the liquid has been raised to a predetermined point, an electric motor having a primary and a secondary circuit connected thereto, so arranged that when the heater circuit is closed the motor will be inactive and will be set in operation through said primary circuit when said heater circuit is broken by the thermostat operating means, means arranged to be actuated by the motor when set in operation, to remove cooked material from the liquid and to deliver a fresh supply of material thereto, according to a predetermined cycle, a two-way switch in said motor circuits arranged to be operated by the motor when the fresh supply of material has been delivered, to move it from its normal position to break said primary circuit and close said secondary circuit, so that when the heater circuit is restored by the thermostat, on the lowering of the temperature of the liquid, the motor will be started and said cycle operation will be finished, and means controlled by the motor as the motor actuated means reaches the end of its cycle, to restore the switch to its normal position.

12. In a cooking machine, a container for cooking liquid, an electric heater therefor, a thermostat having a one way switch arranged to break the heater circuit when the temperature of the liquid in the container is raised to a predetermined point, an electric motor having two electrical circuits connected thereto, one of which has its terminals at opposite sides of said one way switch and the other of which is arranged in parallel with said heater circuit, a two-way switch normally held in position to close said first named circuit, so that when the one way switch is opened, said motor will be operated, operating means arranged to be actuated by said motor to discharge material from said container and to deliver a fresh supply of material thereto and to return said operating means to initial position, means arranged to be actuated by said operating means to move said two-way switch to place the other motor circuit in parallel with the heater circuit before said operating means are returned to initial position, whereby the motor will stop and its operation will not be resumed until the heater circuit has been closed by the thermostat switch upon the lowering of the temperature of the liquid, and means to move said two-way switch back to its initial position when the operating means has been returned to its initial position.

13. In a cooking machine, a container for cooking liquid, heating means therefor, a reticulated basket pivotally mounted for movement from a cooking position within container to a dumping position at one side thereof, a conduit arranged to discharge material into the basket when in cooking position, a hopper leading to the entrance end of said conduit, a pair of valves arranged one above the other in said conduit, a shaft extending transversely of said conduit, a motor for driving said shaft, arms on said shaft arranged, on one complete revolution thereof, to lift said basket to dumping position and to return it to cooking position, to open and close the uppermost valve and then open and close the lowermost valve in time to deliver material to the basket after its contents have been dumped, and automatic electrical controlling means for the motor arranged to set the motor in operation when the temperature of the cooking liquid is raised to a predetermined point, to cause a complete rotation of said shaft and to discontinue the operation thereof when said rotation has been completed.

14. In a cooking machine, an open top container for cooking liquid, a reticulated basket pivotally mounted at one side to swing about a horizontal axis located above the top edge of a side wall of the container, to permit the basket to swing between a cooking position in which its bottom portion may be submerged in the liquid of the container and a dumping position in which said bottom portion is raised above the level of its axis and the side at which it is pivoted is inclined downwardly from its bottom, a motor, a shaft driven thereby, a crank arm on said shaft, a link pivotally connecting to said arm at one end and to the basket at its opposite end at a point removed from said pivotal axis, whereby on a partial revolution of said shaft said basket will be swung upward from its initial to its dumping position and on further revolution will be returned to cooking position, and means for causing said motor to make a single revolution of said shaft at the end of each cooking operation.

15. In a cooking machine, a container for cooking liquid, heating means therefor, an electric motor having a primary and a secondary electric circuit connected thereto, a rotary shaft arranged to be actuated by said motor to discharge cooked material from the container and to deliver a fresh supply of material thereto, a thermostat, electrical controlling means arranged to be operated by said thermostat when the temperature of the liquid in the container has been raised to a predetermined point to set said motor in operation by current supplied to said primary circuit, to perform said discharging and supplying operations, a two-way switch arranged to make or break both of said motor circuits in the opposite positions thereof and having an operating arm, an arm on said shaft arranged to move said operating arm to break said primary circuit when said supplying operation has been completed and before said shaft has made a completed rotation and to close said secondary circuit at said two way switch, whereby the motor will be stopped until said secondary circuit is reestablished by the controlling means of the thermostat when the temperature of the liquid has been lowered, and means to move said switch arm back to its original position when the motor has completed the rotation of said shaft.

16. In a cooking machine, a container for cooking liquid, an electric heater for said container, an electric motor, separate circuits for said heater and motor, operating means arranged to be actuated by said motor when set in operation to discharge cooked material from the container and deliver a fresh supply thereto, a thermostat arranged to be influenced by the temperature of the liquid in the container, controlling means arranged to be operated by said thermostat to set said motor in operation when the temperature of the liquid is raised to a predetermined point, means to break said motor and heater circuits when the fresh supply of material has been delivered, and means controlled by said thermostat to restore said heater circuit when the temperature of the liquid has been lowered.

17. In a cooking machine, a container for cooking liquid, a heater therefor, a thermostat arranged to be influenced by the temperature of the liquid therein, an electric switch arranged to be moved from its normal position by said thermostat when the temperature of the liquid is raised to a predetermined point and to be restored to normal position when the temperature of the liquid is reduced to another point, and means arranged to be moved from a normal stationary position to remove material from the container and deliver a fresh supply thereto and to be set in operation by movement of said switch from its normal position and to be returned to its normal position when said switch has been returned to normal position.

18. In a cooking machine, a container for cooking liquid, an electric heater arranged to heat the liquid therein, a thermostat arranged to be influenced by the temperature of the liquid in the container, an electric switch normally closing the circuit thru said heater and arranged to be opened by said thermostat when the temperature of the liquid is raised to a predetermined point, and to be closed again when the temperature thereof is reduced to another point, a normally inactive electric motor arranged to be set in operation by the opening of said switch, means arranged to be actuated by said motor to discharge cooked material from the container and to deliver a fresh supply of material thereto, means to break the motor circuit when the fresh supply of material has been delivered, and means to return the motor actuated means to its initial position when said switch is closed.

19. In a cooking machine, a container for cooking liquid, heating means therefor, a normally stationary electric motor having a switch for controlling the supply of current thereto, means arranged to be operated by said motor when actuated to discharge cooked material from the container and deliver a fresh supply thereto according to a predetermined cycle, a thermostat arranged to be influenced by the temperature of said liquid to operate said switch to cause actuation of said motor when the temperature of the liquid has been raised to a predetermined point, a normally closed secondary switch in said motor circuit and means for moving the same to break said circuit when the fresh supply of material has been delivered, and means controlled by said thermostat to restore said secondary switch to its normal position when the temperature of the liquid has been lowered.

20. In a cooking machine, a container for a cooking medium adapted to receive a batch of material to be cooked, heating means therefor, an electric motor, means arranged to be actuated by the motor to remove cooked material from the medium, a thermostat arranged to be influenced by the temperature of the cooking medium in the container, and mechanism including a switch under the control of the thermostat for causing said motor and motor-actuated means to remove the cooked material from the container when the temperature of the medium is raised to a predetermined point.

21. In a cooking machine, a container for a cooking medium adapted to receive successive batches of material to be cooked, heating means therefor, a thermostat arranged to be influenced by the temperature of the medium in the container, and power operated means under the control of the thermostat for removing the cooked batch of material from the container when the temperature of the medium is raised to a predetermined point and subsequently placing a batch of uncooked material in said medium.

22. A machine for automatically treating successive batches of a material uniformly in a heating medium, comprising a container for the heating medium, heating means therefor, a hopper for the untreated material, means for intermittently delivering measured batches of the material from the hopper to the medium in the container, means for removing the cooked batches of material from the container, a thermostat arranged to be influenced by the temperature of the medium in the container, and power mechanism under the control of the thermostat for causing the third named means to remove a cooked batch of material from the container when the temperature of the medium has been raised to a predetermined point and for causing the second named means directly thereafter to deliver a measured batch of uncooked material from the hopper to the medium in the container.

23. In a cooking machine, a container for a cooking medium, means cooperating with the container for holding material to be cooked, heating means for the container and said medium, a rotary power element, mechanism arranged to be driven by the power element and cooperating with the material-holding means to move the same through a predetermined cycle including one position wherein the material-holding means is in cooking location within the container and another position wherein the material-holding means is raised therefrom, a thermostat arranged to be influenced by the temperature of the cooking medium in the container, and mechanism under the control of the thermostat for automatically causing the power element to drive said mechanism through said cycle when the temperature of said medium is raised to a predetermined point.

GEORGE H. BUSHWAY.